United States Patent
Schug et al.

(10) Patent No.: US 10,155,460 B2
(45) Date of Patent: Dec. 18, 2018

(54) LOCKING DEVICE, ESPECIALLY FOR LOCKING A BACKREST OF A VEHICLE SEAT TO A VEHICLE STRUCTURE

(71) Applicant: Adient Luxembourg Holding S.à.r.l., Luxembourg (LU)

(72) Inventors: Andreas Schug, Oberhausen (DE); Joerg Rapedius, Muenchweiler (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 0 days.

(21) Appl. No.: 15/527,476

(22) PCT Filed: Nov. 16, 2015

(86) PCT No.: PCT/EP2015/076661
§ 371 (c)(1),
(2) Date: May 17, 2017

(87) PCT Pub. No.: WO2016/079041
PCT Pub. Date: May 26, 2016

(65) Prior Publication Data
US 2017/0327012 A1   Nov. 16, 2017

(30) Foreign Application Priority Data
Nov. 18, 2014 (DE) .......................... 10 2014 223 556

(51) Int. Cl.
*B60N 2/36* (2006.01)
*B60N 2/015* (2006.01)
(Continued)

(52) U.S. Cl.
CPC ......... *B60N 2/366* (2013.01); *B60N 2/01583* (2013.01); *B60N 2/146* (2013.01); *B60N 2/2245* (2013.01); *E05B 17/0033* (2013.01); *E05B 85/26* (2013.01); *E05C 3/24* (2013.01); *B60N 2/01525* (2013.01); *B60N 2/01541* (2013.01); *B60N 2/20* (2013.01)

(58) Field of Classification Search
CPC .. B60N 2/01583; B60N 2/2245; B60N 2/366; B60N 2/146; B60N 2/01525; B60N 2/20; B60N 2/01541
USPC ................................................ 297/378.13
See application file for complete search history.

(56) References Cited

U.S. PATENT DOCUMENTS 5,662,369 A * 9/1997 Tsuge ................ B60N 2/366
297/378.13 X
5,741,046 A * 4/1998 Leuchtmann .......... B60N 2/366
297/378.13 X
(Continued)

FOREIGN PATENT DOCUMENTS

DE   10 2004 056 143 A1   5/2006
DE   10 2007 016 409 A1   10/2008
(Continued)

*Primary Examiner* — Rodney B White
(74) *Attorney, Agent, or Firm* — McGlew and Tuttle, P.C.

(57) ABSTRACT

A locking device (100), especially for locking a backrest (4) of a vehicle seat (1) to a vehicle structure (6), includes a rotary latch lock (20) for locking a mating element (8). The locking device (100) further includes an ejection lever (133) which, in an unlocked state of the rotary latch-type lock (20), moves the mating element (8) relative to the rotary latch-type lock (20) by actuating an operating handle (121).

20 Claims, 5 Drawing Sheets (51) Int. Cl.
*B60N 2/22* (2006.01)
*E05B 85/26* (2014.01)
*E05C 3/24* (2006.01)
*E05B 17/00* (2006.01)
*B60N 2/14* (2006.01)
*B60N 2/20* (2006.01)

(56) References Cited

U.S. PATENT DOCUMENTS

| | | | | |
|---|---|---|---|---|
| 7,044,552 | B2* | 5/2006 | Muller | B60N 2/01583 |
| | | | | 297/378.13 X |
| 7,226,129 | B2* | 6/2007 | Brandes | B60N 2/366 |
| | | | | 297/378.13 X |
| 7,416,254 | B2* | 8/2008 | Jennings | B60N 2/366 |
| | | | | 297/378.13 X |
| 8,757,679 | B2* | 6/2014 | Torkowski | E05B 81/14 |
| | | | | 297/378.13 X |
| 2011/0006576 | A1* | 1/2011 | Muller | B60N 2/01583 |
| | | | | 297/378.13 |
| 2011/0006577 | A1* | 1/2011 | Muller | B60N 2/01583 |
| | | | | 297/378.13 |

FOREIGN PATENT DOCUMENTS

| | | |
|---|---|---|
| DE | 10 2010 055 246 A1 | 6/2012 |
| DE | 10 2011 101 283 B3 | 9/2012 |
| EP | 2 127 939 A1 | 12/2009 |
| WO | 2010/066319 A1 | 6/2010 |

* cited by examiner

LOCKING DEVICE, ESPECIALLY FOR LOCKING A BACKREST OF A VEHICLE SEAT TO A VEHICLE STRUCTURE

CROSS REFERENCE TO RELATED APPLICATIONS

This application is a United States National Phase Application of International Application PCT/EP2015/076661, filed Nov. 16, 2015, and claims the benefit of priority under 35 U.S.C. § 119 of German Applications 10 2014 223 556.1, filed Nov. 18, 2014, and 20 2015 103 395.8 filed Jun. 29, 2015, the entire contents of which are incorporated herein by reference.

FIELD OF THE INVENTION

The present invention relates to a locking device, especially for locking a backrest of a vehicle seat to a vehicle structure, having a rotary latch lock for locking a counter element.

BACKGROUND OF THE INVENTION

Locking devices for locking a backrest of a vehicle seat, which is foldable relative to a sitting surface, on a vehicle structure are generally known in the prior art. These types of locking devices include an operating element, by means of which a rotary latch lock, which is fastened on the vehicle structure or on the backrest and is lockable with a corresponding counter element which is fastened on the backrest or the vehicle structure, is able to be unlocked.

DE 10 2007 016 409 A1 discloses a lock for a vehicle, in particular for a vehicle seat, which, in a locked state, interacts with a counter element. The lock includes a pawl, which is mounted so as to be rotatable about a first bearing bolt and comprises a receiving means for the counter element as well as an operating surface, a catch element which is mounted so as to be rotatable about a second bearing bolt and a clamping eccentric which is mounted so as to be rotatable about the second bearing bolt and, with the lock in the locked state, interacts with the operating surface in order to secure the locked state of the lock. Such a lock is also designated as a rotary latch lock or, in short, a rotary latch. For unlocking the lock, first of all the catch element is pivoted away from the operating surface of the pawl. The clamping eccentric is then entrained by the catch element or an actuating element of the catch element and, as a result, is also pivoted away from the operating surface of the pawl. The pawl opens on account of a spring pre-load and releases the counter element.

DE 10 2010 055 246 A1 discloses a vehicle seat with a backrest which is pivotable relative to a vehicle structure out of a position of use into a position of non-use and is lockable to the vehicle structure in the position of use by means of a locking device. The locking device is connected to the backrest and comprises a locking element, which is configured as a pawl and, in the position of use, is in locking engagement with a counter element of the vehicle structure which is realized as a closing bolt. The unlocked backrest is pivotable by a certain amount out of the position of use into an ejection position by means of an ejector. From there, the backrest can be pivoted further into its position of non-use by hand. Unwanted, automatic locking of the lock prior to pivoting the backrest forward is avoided as a result of the ejection position.

SUMMARY OF THE INVENTION

It is and object of the present invention, in particular, to provide a locking device, which has been improved in relation to the prior art, for locking a foldable backrest of a vehicle seat on a vehicle structure. In particular, the backrest is to be transferable into an ejection position and the energy necessary to do this is to be introducible by means of an operating handle. In particular, a rotary latch lock disclosed in the prior art is to be upgradeable by an ejection function.

The object is achieved according to the invention by a locking device, especially for locking a backrest of a vehicle seat to a vehicle structure, having a rotary latch lock for locking a counter element, wherein the locking device comprises an ejection lever which, with the rotary latch lock in an unlocked state, displaces the counter element relative to the rotary latch lock as a result of an operating handle being actuated.

By the locking device comprising an ejection lever which, with the rotary latch lock in an unlocked state, displaces the counter element relative to the rotary latch lock as a result of an operating handle being actuated, the energy necessary to the relative displacement of the counter element is able to be introduced by means of an operating handle. This means that the locking device does not need any high-performance energy store. An operating handle is to be understood as all operating elements onto which a user is manually able to apply a force, for example levers, handles, buttons or pull loops. The counter element can be a bolt or a wire bracket.

The rotary latch lock preferably comprises a pawl which is rotatable about a first pivot axis for locking the counter element, and at least one securing element which is rotatable about a second pivot axis for supporting the pawl in a position which locks the counter element. The at least one securing means can be a catch piece. A clamping eccentric can be provided in addition to the catch piece. A clamping eccentric serves for releasing play between the pawl and the counter element.

The at least one securing element can be rotatable into an intermediate position as a result of the operating handle being actuated, wherein the pawl in said intermediate position is rotatable into an unlocked position in which the counter element is released by the pawl. The pawl is preferably pre-loaded in an opening direction by means of a pre-loaded spring arrangement. The spring arrangement supports a rotational movement of the pawl as soon as the at least one securing means releases the rotational movement. The pawl can comprise a receiving means, out of which the counter element is not able to move when the pawl is in the locked state. With the pawl in the unlocked state, the counter element is released from the pawl, as a result of which the counter element is able to leave the receiving means or is able to move inside the receiving means, in particular by means of the ejection lever.

With the pawl in the unlocked position, the ejection lever moves the counter element relative to the pawl in particular as a result of the operating handle being actuated further beyond the intermediate position. In said altered relative position of the pawl and the counter element, the pawl is not able to relock. The operating handle can consequently be released without the locking device locking again. This is advantageous, for example, when the locking device serves for locking a foldable backrest of a vehicle seat on a vehicle structure, and a user unlocks the backrest first of all, releases the operating handle again, and only then wishes to pivot the backrest.

The rotary latch lock can be a fully functional unit for locking a counter element without further components being necessary for this purpose. The rotary latch lock is able to be supplemented in a modular manner by the ejection lever and in particular further components of the locking device. A construction kit is created as a result. For applications in which relative displacement of the pawl and counter element is not absolutely necessary, or the spring pre-load of the pawl is already large enough for this purpose, for example on account of the backrest being very low in weight and having a very slight inclination, it is possible to install the rotary latch lock without an ejection lever.

A lever is preferably arranged between the operating handle and the at least one securing means, wherein the lever reduces an unlocking force, which is to be applied in particular on the operating handle, for rotating the at least one securing means. It is possible to increase the operating path as a result of a gearing generated by the lever.

In a preferred embodiment, the lever is mounted so as to be rotatable about the second pivot axis, about which the at least one securing means is also rotatable. The lever can be coupled with the at least one securing means. The lever can be coupled with a catch element, in particular by means of a first journal, which engages in an actuating opening of a catch element. The lever can be coupled at least temporarily with a connecting element. The connecting element can be a Bowden cable or a cable pull, the connecting element being coupled at least indirectly on the operating handle. The coupling between the connecting element and the lever can comprise a freewheel in one direction. For example, one cable end of a Bowden cable can run through an eyelet which is connected to the lever and can comprise a weight as an end piece. As a result, the cable pull can be moved through the eyelet in one direction, whilst in the other direction, where applicable after running through a free travel, the weight entrains the eyelet and consequently the lever. The eyelet can be connected to the lever by means of a second journal. The first journal, with reference to the second pivot axis, is preferably arranged further radially inside than the second journal.

The lever and the ejection lever can be coupled together in such a manner by means of an entrainment means that actuation of the operating handle up to an intermediate position rotates the lever, whilst the ejection lever remains unmoved, and actuation of the operating handle beyond the intermediate position rotates the lever and the ejection lever. As a result, the ejection lever only exerts a force onto the counter element when the pawl is unlocked and the counter element is able to move out of the receiving means of the pawl and out of a receiving means of the lock housing.

The locking device can be fastened on the vehicle structure and the counter element can be fastened on the backrest. Such an arrangement can be advantageous, for example, in notchback vehicles where the locking device is fastened on the rear shelf and the counter element on the backrest.

The locking device can be fastened on the backrest and the counter element can be fastened on the vehicle structure. Such an arrangement can be advantageous, for example, in estate vehicles.

In other words, the locking device includes a movement unit which is realized and coupled with the operating handle in such a manner that when the rotary latch lock is opened by means of the operating handle, a force can be generated at the movement unit, which force generates a movement of the backrest relative to the vehicle structure in the region of the locking device and consequently of the rotary latch lock relative to the counter element in such a manner that the rotary latch lock and the counter element are movable out of a locking position.

The advantages obtained with the invention consist, in particular, in that when, by means of the operating handle, the locking device is opened and consequently the backrest unlocked, a relative movement of the counter element is effected out of the position in which mechanical engagement of the counter element in the rotary latch lock is possible. This avoids the backrest once again being locked on the vehicle structure after termination of the actuation of the operating handle and of the resultant return movement of the rotary latch lock and of the backrest not moved by the user. In a particularly advantageous manner, no additional and expensive drive elements, for example spring elements, are necessary for the movement of the backrest, carried out in this case, about a pivot axis of the foldable backrest. Consequently, it is possible in a particularly advantageous manner for the user to trigger the locking of the backrest in a convenient manner, for example from a trunk of the vehicle, and to fold the backrest from a passenger compartment of the vehicle.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
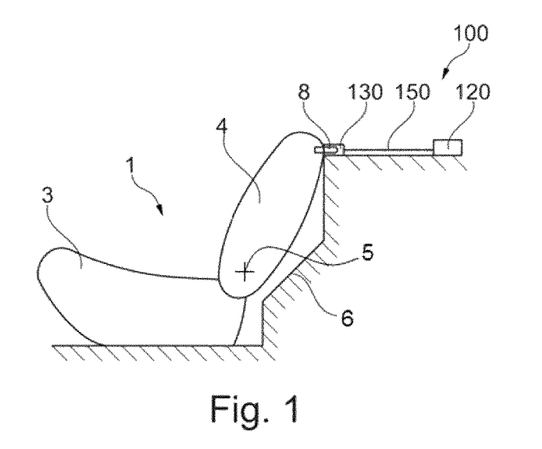
FIG. 1 is a schematic representation of a side view of a vehicle seat with a locking device for locking a foldable backrest of a vehicle seat on a vehicle structure.

Referring to the drawings, FIG. 1 shows a vehicle seat 1 with a seat part 3 and a rest 4, mounted in a vehicle structure 6. The rest 4 is designed as a backrest for supporting a back of a passenger and is pivotable relative to the seat part 3 about a backrest rotational axis 5. As a result, the backrest 4 can be pivoted out of a position of use suitable for passenger transportation into a largely horizontal position of non-use and back. FIG. 1 shows the position of use. To secure the backrest 4 in the position of use against being unintentionally pivoted forward, a locking device 100 is fastened on the vehicle structure 6, said locking device being able to receive and lock a counter element 8 which is connected fixedly to the backrest 4 and is realized as a wire bracket. The arrangement of the locking device 100 and of the counter element 8 can also be interchanged in a modification of the exemplary embodiment in such a manner that the locking device 100 is connected fixedly to the backrest 4 and the counter element 8 is connected fixedly to the vehicle structure 6.

Figure 2:
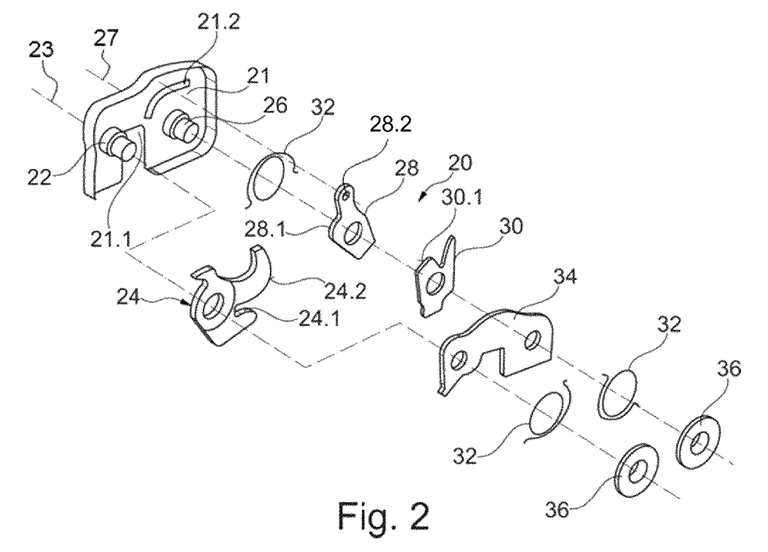
FIG. 2 is a schematic representation of an exploded drawing of a rotary latch lock disclosed in the prior art.

FIG. 2 shows, as an example, a rotary latch lock 20 which is disclosed in the prior art, as can be used as a component of the locking device 100. The locking device 100 according to the invention, however, is not restricted to the use of precisely said rotary latch lock 20. Other rotary latch locks 20 disclosed in the prior art are also able to be used in the locking device 100.

The rotary latch lock 20 includes a lock housing 21 which, in the present case, is realized in one piece and is half-open, but which can also be in two pieces and closed. A first bearing bolt 22 protrudes perpendicularly from the lock housing 21 and, in the present case, is realized hollow inside as a sleeve with a passage opening. The first bearing bolt 22 defines a first pivot axis 23 and supports a pivotable pawl 24. The directional specifications used below relate to the cylinder coordinates defined thereby.

For interaction with the counter element 8, the lock housing 21 and the pawl 24 comprise in each case a receiving means 21.1 or rather 24.1, which cross one another when the rotary latch lock 20 is in a locked state. With the rotary latch lock 20 in an unlocked state, the pawl 24 is pivoted such that its receiving means 24.1 and the receiving means 21.1 of the lock housing 21 are ready to receive the counter element 8, or rather the counter element 8 is able to move out of the rotary latch lock 20.

A second bearing bolt 26, which is parallel to the first bearing bolt 22, also protrudes perpendicularly from the lock housing 21 and, in the present case, is also realized hollow inside as a sleeve with a passage opening. The second bearing bolt 26 defines a second pivot axis 27 which is arranged offset and parallel to the first pivot axis 23. The second bearing bolt 26 supports a catch element 28 and, along the second bearing bolt 26, offset thereto, a clamping eccentric 30, both of which are pivotable independently of one another and are arranged between two planes which are defined by the thickness of the material of the planar pawl 24. The pawl 24, the catch element 28 and the clamping eccentric 30 are in each case pre-loaded in one pivot direction, in the present case by means of springs 32, the pawl 24 being pre-loaded in its opening direction and the catch element 28 and the clamping eccentric 30 in their closing direction.

With the rotary latch lock 20 in the locked state, by means of a clamping surface 30.1 which is curved eccentrically in relation to the second bearing bolt 26, the preloaded clamping eccentric 30 acts upon the pawl 24 with a force in order to exert a closing torque on the pawl 24. An operating surface 24.2 of the pawl 24 interacts with the clamping surface 30.1, an angle between the clamping surface 30.1 and the operating surface 24.2 being outside the self-locking range.

With the rotary latch lock 20 in the locked state, the catch element 28 is arranged with a catch surface 28.1 at a spacing from the operating surface 24.2. If, in the event of a crash, the pawl 24, as a result of the forces occurring between the rotary latch lock 20 and the counter element 8, exerts an opening torque on the clamping eccentric 30 and said clamping eccentric begins to open, after a short pivot, the pawl 24 moves to abut against the catch surface 28.1 by way of its operating surface 24.2. The angle between the catch surface 28.1 and the operating surface 24.2 is within the self-locking range, i.e. the pawl 24 is not able to exert any opening torque on the catch element 28. The catch element 28 therefore supports the pawl 24 in the event of a crash. The catch element 28 and the clamping eccentric 30 are consequently securing elements.

A coupling plate 34, which is placed onto the two bearing bolts 22, 26 and is secured on the bearing bolts 22, 26 by means of two locking rings 36, is provided to improve the capacity of the rotary latch lock 20, in particular in the event of a crash. The pawl 24, the catch element 28 and the clamping eccentric 30 are consequently arranged spatially between the lock housing 21 and the coupling plate 34.

Proceeding from an unlocked state of the rotary latch lock 20, the unlocked rotary latch lock 20 and the counter element 8 move closer to one another during the locking operation, i.e. the transition from the unlocked state into the locked state, until the counter element abuts against the pawl 24. During the further progression of the locking operation, the counter element 8 moves into the receiving means 24.1 of the pawl 24 and to the bottom of the receiving means 21.1 of the lock housing 21—on account of the pawl 24, acted upon by the counter element 8, pivoting in a closing movement. The counter element 8 is then held between an edge region of the receiving means 24.1 of the pawl 24 and an edge region of the receiving means 21.1 of the lock housing 21. The catch element 28 and the clamping eccentric 30—on account of their pre-load—carry out a closing pivoting movement toward the pawl 24.

The pawl 24 is secured in the locked state, in the normal case by the clamping eccentric 30 and in the event of a crash by the catch element 28. For the unlocking operation, i.e. the transition from the locked state into the unlocked state, the catch element 28 is first of all opened, i.e. pivoted away from the operating surface 24.2. To this end, the catch element 28 comprises an actuating opening 28.2 which is arranged eccentrically to the second bearing bolt 26 and is able to receive a component which is not shown in FIG. 2, actuates the catch element 28 and will be described in more detail below by way of further Figures. The component which actuates the catch element 28 can extend through the lock housing 21, coming from the outside, through a passage opening 21.2 in the lock housing 21. The passage opening 21.2 is realized in a circular manner about the second bearing bolt 26.

When the catch element 28 is pivoted, the clamping eccentric 30, after passing through a flat angle, is entrained by the catch element 28 and is also opened. With the rotary latch lock 20 in the uninstalled state, the pawl 24 opens on account of its pre-load which is generated by the spring 32. With the rotary latch lock 20 in the installed state, however, the pawl 24 only opens on account of its pre-load if the weight of the backrest 4 exerts a torque on the backrest 4 in the direction of the position of use that is smaller than a torque that is generated by the pre-load of the pawl 24 in the direction of the position of non-use of the backrest 4. In the exemplary embodiment, the weight of the backrest 4 in the position of use exerts torque of such an amount about the backrest rotational axis 5 onto the backrest 4 in the direction of the position of use that the pre-load of the pawl 24 is not sufficient to pivot the pawl 24 and consequently the backrest 4 by such an amount that the counter element 8 is able to move out of the receiving means 21.1 of the lock housing 21. So that the backrest 4, once the catch element 28 and the clamping eccentric 30 are open, nevertheless pivots so far in the direction of the position of non-use that the pawl 24 is not able to lock again unintentionally, the locking device 100 comprises further components which are described below.

Figure 3:
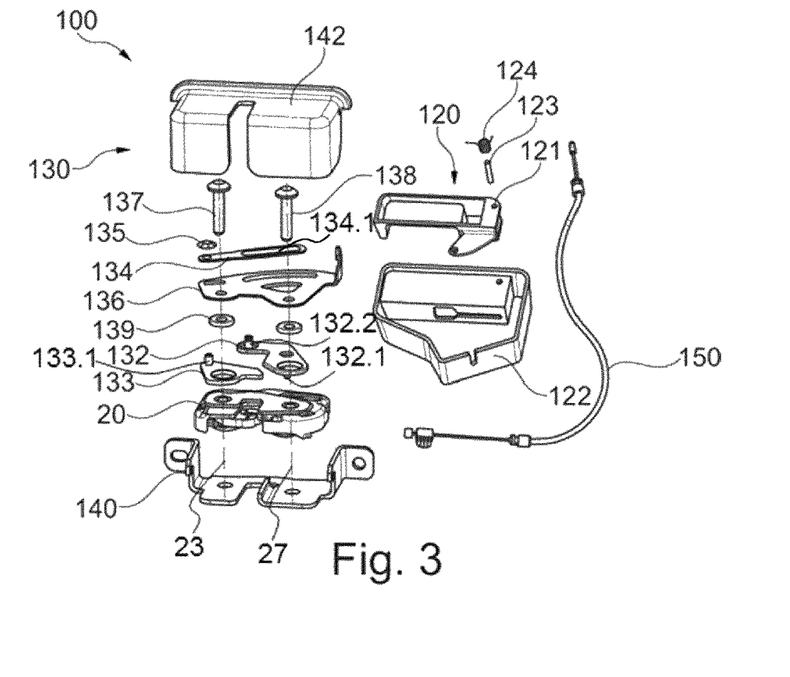
FIG. 3 is an exploded drawing of a locking device according to the invention for locking a foldable backrest of a vehicle seat on a vehicle structure.

FIG. 3 shows an exploded representation of a possible exemplary embodiment of the locking device 100 according to the invention for locking the pivotable backrest 4 of the vehicle seat 1 on a vehicle structure 6.

The locking device 100 includes an operating element 120 with an operating handle 121 which is arranged in an operating element housing 122 so as to be rotatable about a rotational axis. A guide pin 123, on which the operating handle 121 is rotatably arranged, is provided in the operating element housing 122 for forming the rotational axis. In addition, the operating element 120 includes a spring element 124, which is realized as a leg spring and, after the operating handle 121 has been actuated, enables it to return automatically into its starting position. The operating element 120 is arranged, for example, in the region of a trunk of the vehicle or in an upper region of the backrest 4.

In addition, the locking device 100 includes a locking element 130 with the rotary latch lock 20 and a lever 132, which, as an actuating component, is operatively connected in a mechanical manner to the previously described catch element 28 of the rotary latch lock 20. To this end, the lever 132 comprises a first journal 132.1 which engages in the actuating opening 28.2 of the catch element 28 through the passage opening 21.2 of the lock housing 21. The lever 132 is mounted so as to be rotatable and concentric to the second bearing bolt 26. A second journal 132.2 of the lever 132 is arranged further radially outside with reference to the second bearing bolt 26 and serves for actuating the lever 132. By the second journal 132.2 being arranged further radially outside than the first journal 132.1, the unlocking forces of the rotary latch lock 20 are reduced.

In addition, the locking element 130 includes an ejection lever 133 which is mounted so as to be rotatable and concentric to the first bearing bolt 22, and which forms a movement unit together with an entrainment means 134. The movement unit includes the lever 132, the ejection lever 133 and the entrainment means 134. The entrainment means 134 comprises an elongated hole 134.1 in which the second journal 132.2 is guided. The entrainment means 134 is rotatably fastened on a coupling pin 133.1 of the ejection lever 133 by means of a lock washer 135. A bearing element 136 is arranged between the lever 132 and the ejection lever 133 on the one side and the entrainment means 134 on the other side. The bearing element 136 comprises passage openings, through which the second journal 132.2 and the coupling pin 133.1 run without being impeded from moving about the respective rotational axes. The bearing element 136 comprises a support for an outer sleeve of a connection element 150 which is realized as a Bowden cable.

The rotary latch lock 20, the lever 132, the ejection lever 133, the entrainment means 134 and the bearing element 136 are fastened on a fastening plate 140 by means of two screws 137, 138 with the interposition of, in each case, a bearing bush 139 and are arranged in a locking element housing 142.

The locking element 130 is fastenable on the backrest 4 or on the vehicle structure 6 by means of the fastening plate 140, the counter element 8, which corresponds with the rotary latch lock 20 and is shown in FIGS. 5 to 9, being fastened on the vehicle structure 6 or the backrest 4 in dependence on the arrangement of the locking element 130. The rotary latch lock 20 and the counter element 8, which is realized, for example, as a locking bolt or locking bracket, are mechanically engaged with one another in the previously described manner during a locked state of the backrest 4, the rotary latch lock 20 surrounding, or rather receiving, the counter element 8 in a known manner at least in portions and preventing a relative movement between the rotary latch lock 20 and the counter element 8.

In order to make it possible to open the locking of the rotary latch lock 20 by operating the operating element 120, the operating handle 121 is mechanically connected to the lever 132, and consequently to the rotary latch lock 20, by means of the connecting element 150 which is realized as a Bowden cable, the lever 132 being rotated and the rotary latch lock 20 opened when the operating handle 121 is rotated. In this case, where applicable after running through a free travel, the lever 132 is first of all rotated into an intermediate position without the ejection lever 133 being entrained. Only when the second journal 132.2 moves to an end of the elongated hole 134.1 of the entrainment means 134 is the entrainment means 134 entrained by the second journal 132.2, as a result of which the ejection lever 133 is also rotated.

Figure 4:
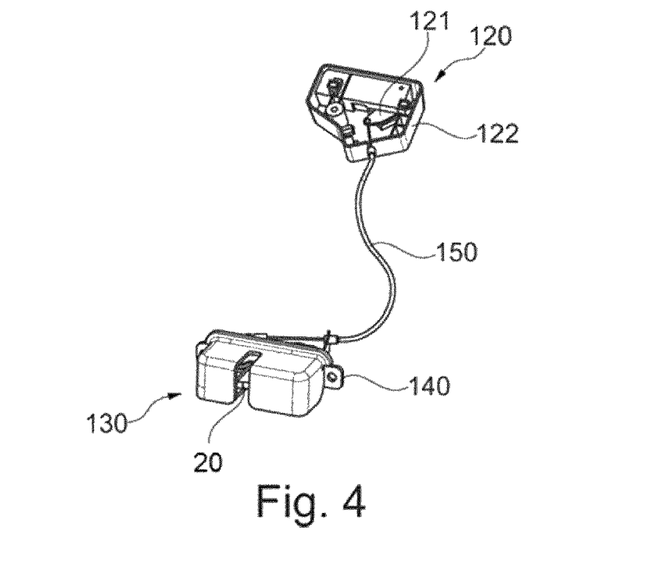
FIG. 4 is a schematic representation of the locking device according to FIG. 3 in perspective.

FIG. 4 shows a perspective representation of the locking device 100 according to FIG. 3.

Figure 5:
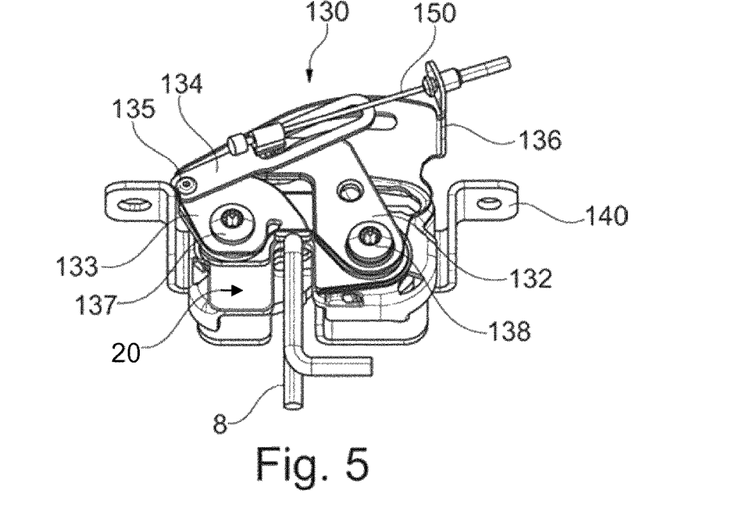
FIG. 5 is a schematic representation of a detail of the locking device according to FIG. 3 in perspective, in a state locked with a counter element.

FIG. 5 shows a perspective representation of a detail of the locking device 100 according to FIG. 3 in a locked state. In this connection, the rotary latch lock 20 and the counter element 8, which is realized as a locking bracket in the exemplary embodiment shown, are engaged together mechanically, that is to say are in the locked state, the pawl 24 of the rotary latch lock 20 surrounding the counter element 8 in portions and preventing a relative movement between the rotary latch lock 20 and the counter element 8.

Figure 6:
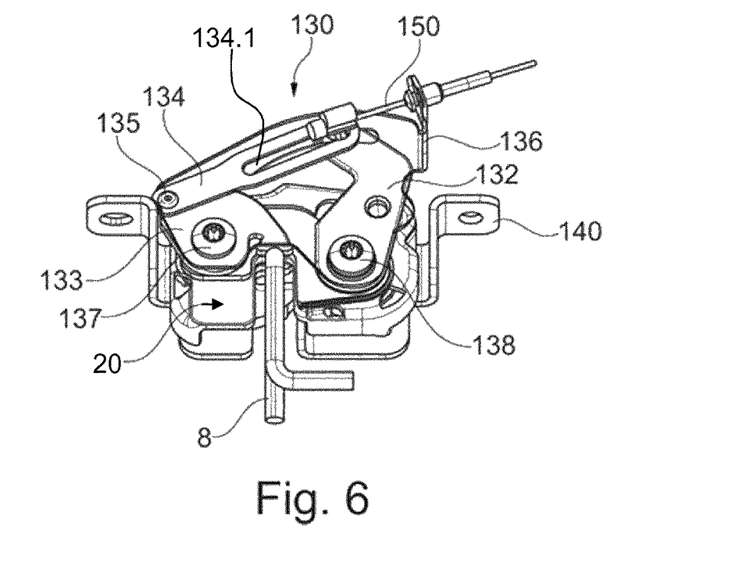
FIG. 6 is a schematic representation of the detail of the locking device according to FIG. 5 in perspective, during unlocking in a first state.

FIG. 6 shows a perspective representation of the detail of the locking device 100 according to FIG. 5 during unlocking in a first state.

For unlocking, the operating handle 121 of the operating element 120 is actuated, in the present case rotated about the guide pin 123. As a result, the lever 132, which is coupled with the rotary latch lock 20, is rotated about a rotational axis, which is formed by means of the screw 138, by means of a cable pull of the connecting element 150, which is realized as a Bowden cable. To this end, one end of the cable pull is connected to the operating handle 121. The other end of the cable pull is guided through an eyelet, which is fastened on the second journal 132.2, and comprises a weight, the diameter of which is greater than a diameter of an opening of the eyelet such that when the cable pull is pulled, the weight of the cable pull moves to abut against the eyelet and rotates the lever 132. The weight can be removed from the eyelet in the opposite direction such that a freewheel is provided between the cable pull and the lever 132.

In the first state during unlocking shown in FIG. 6, the lever 132 has already been rotated such that the rotary latch lock 20 is situated at a so-called dead center directly prior to its unlocking. The pawl 24 is only just prevented from opening by the clamping eccentric 30. Actuating the operating handle 121 a little further into an intermediate position, which is not shown in the Figures, causes the lever 132 to be pivoted a little further. As a result, the catch element 28 and the clamping eccentric 30 are rotated in the manner previously described until the pawl 24 is able to open.

Figure 7:
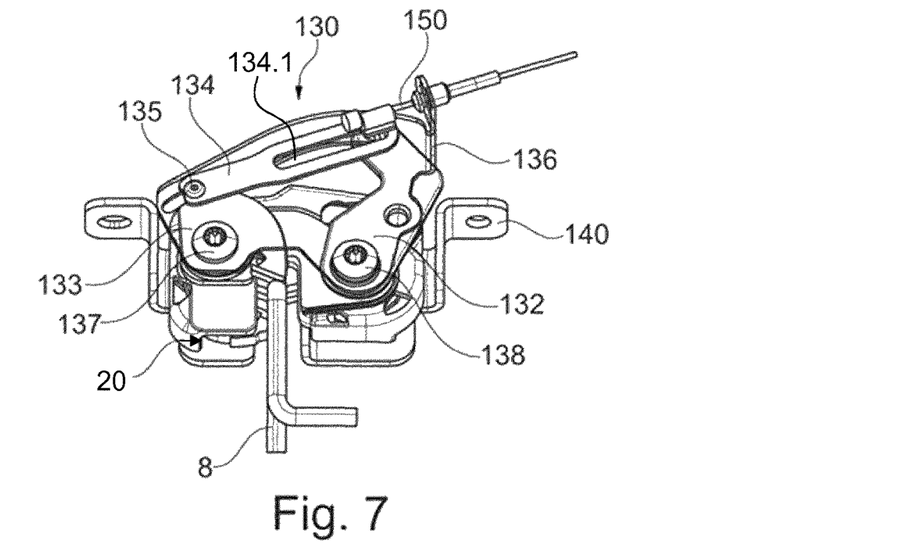
FIG. 7 is a schematic representation of the detail of the locking device according to FIG. 5 in perspective, during unlocking in a second state.

FIG. 7 shows a perspective representation of the detail of the locking device 100 according to FIG. 5 during unlocking and in a second state. On account of reaching the intermediate position of the operating handle 121, carried out beforehand, the rotary latch lock 20 is opened and the counter element 8 released. In addition, the second journal 132.2 abuts against an end of the elongated hole 134.1 in the entrainment means 134 such that the entrainment means 134 transmits a rotational movement of the lever 132 to the ejection lever 133. When the operating handle 121 is actuated further beyond the intermediate position, the ejection lever 133 is rotated about a rotational axis which is formed by means of the screw 137. This generates a force onto the counter element 8 such that said counter element is displaced relative to the locking element 130. As a result, the backrest 4 is pivoted forward slightly about the backrest rotational axis 5 relative to the vehicle structure 6. This makes it possible for the backrest 4 to be held in a slightly pivoted-forward position in which the rotary latch lock 20 is not able to relock. As a result, once the locking device 100 has been unlocked, a user is able to fold down the backrest 4 in a simple manner from a different position.

Figure 8:
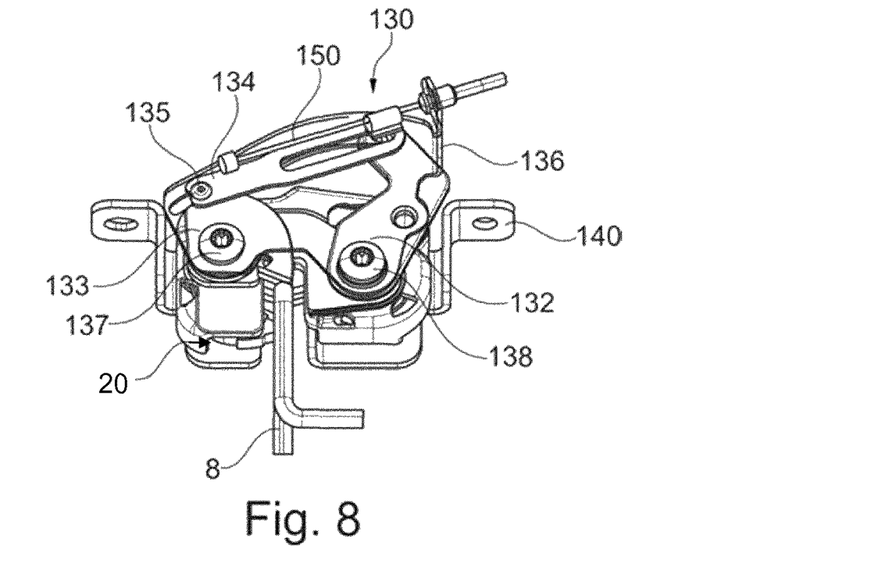
FIG. 8 is a schematic representation of the detail of the locking device according to FIG. 5 in perspective, after unlocking in a third state.
Figure 9:
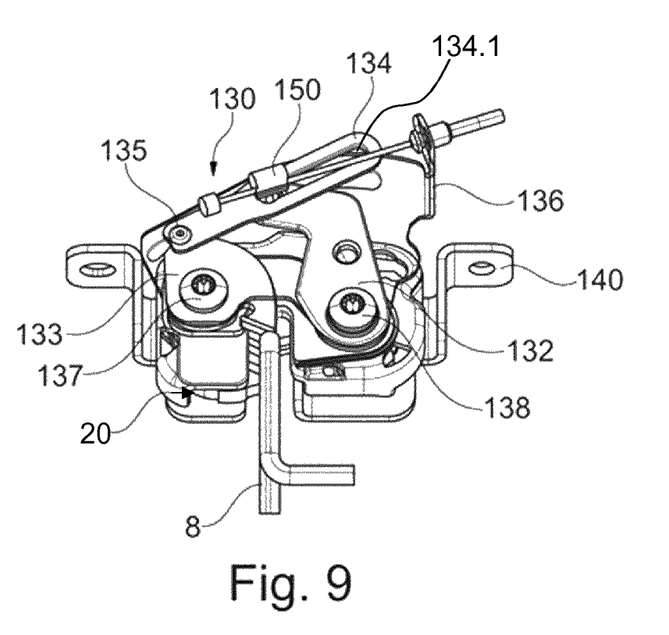
FIG. 9 is a schematic representation of the detail of the locking device according to FIG. 5 in perspective, after unlocking in a fourth state.

In the position shown in FIG. 8, the catch element 28 and the clamping eccentric 30 are situated in a position which is deflected to the maximum and neither are in contact with the pawl 24. By terminating the actuation of the operating handle 121, the weight of the cable pull of the connecting element 150 is removed from the eyelet of the second journal 132.2. As a result, a partial return movement of the lever 132 is additionally effected in the direction of its starting position until the catch element 28 abuts against the still open pawl 24, as shown in FIG. 9. The counter element 8, in this case, is not yet locked with the rotary latch lock 20.

Locking of the counter element 8 with the rotary latch lock 20, which is not shown in the Figures, is effected by a pivoting-back force being applied onto the backrest 4. As a result, the counter element 8 moves into the receiving means 24.1 of the pawl 24 and rotates it into a locked position. The catch element 28 and the clamping eccentric 30 rotate—as previously described—into the securing position. In addition, the ejection lever 133 is pivoted back from the counter element 8 into its starting position.

The features disclosed in the present description, the claims and the drawings can be important to the realization of the various arrangements of the invention both individually and also in combination.

Although the invention has been described in detail in the drawings and the preceding representation, the representations are to be understood as illustrative and exemplary and not restricting. In particular, the choice of the proportions of the individual elements shown in the drawings is not to be seen as necessary or limiting. In addition, the invention is not limited, in particular, to the exemplary embodiments explained. Further variants of the invention and the realization thereof are produced for the person skilled in the art from the preceding disclosure, the figures and the claims.

Terms used in the claims such as "include", "comprise", "imply", "incorporate" and the like do not exclude further elements or steps. The use of the indefinite article does not exclude a plurality. One single device is able to carry out the functions of several units or devices named in the claims.

While specific embodiments of the invention have been shown and described in detail to illustrate the application of the principles of the invention, it will be understood that the invention may be embodied otherwise without departing from such principles.

The invention claimed is:

1. A locking device, for locking a backrest of a vehicle seat to a vehicle structure, the locking device comprising:
   a rotary latch lock for locking a counter element; and
   an ejection lever which, with the rotary latch lock in an unlocked state, displaces the counter element relative to the rotary latch lock as a result of an operating handle being actuated, wherein the rotary latch lock is a functional unit for locking the counter element which is able to be supplemented in a modular manner by the ejection lever.

2. The locking device as claimed in claim 1, wherein the rotary latch lock comprises:
   a pawl, which is rotatable about a first pivot axis, for locking the counter element, and
   at least one securing means which is rotatable about a second pivot axis for supporting the pawl in a position which locks the counter element, wherein for unlocking the pawl, the at least one securing means, as a result of the operating handle being actuated up to an intermediate position, is rotatable until the pawl is rotatable into an unlocked position in which the counter element is released by the pawl.

3. The locking device as claimed in claim 2, wherein the ejection lever displaces the counter element relative to the pawl by means of the operating handle being actuated further beyond the intermediate position.

4. The locking device as claimed in claim 2, wherein a lever is arranged between the operating handle and the at least one securing means, wherein the lever reduces an unlocking force for rotating the at least one securing means.

5. The locking device as claimed in claim 4, wherein the unlocking force for rotating the at least one securing means is to be applied at the operating handle.

6. The locking device as claimed in claim 4, wherein the lever is mounted so as to be rotatable about the second pivot axis.

7. The locking device as claimed in claim 6, wherein the lever is coupled with the at least one securing means, and the lever is coupled at least temporarily with a connecting element, wherein the connecting element is coupled at least indirectly on the operating handle.

8. The locking device as claimed in claim 7, further comprising a journal, wherein the lever is coupled with the at least one securing means by the journal.

9. The locking device as claimed in claim 8, further comprising another journal, wherein the lever is coupled at least temporarily with the connecting element by the another journal wherein, with reference to the second pivot axis, the journal is arranged further radially inside than the another journal.

10. The locking device as claimed in claim 8, wherein the journal is a first journal and further comprising a second journal, wherein the lever is coupled at least temporarily with the connecting element by the second journal.

11. The locking device as claimed in claim 10, wherein, with reference to the second pivot axis, the first journal is arranged further radially inside than the second journal.

12. The locking device as claimed in claim 7, further comprising a journal, wherein the lever is coupled at least temporarily with the connecting element by the journal.

13. The locking device as claimed in claim 12, further comprising an entrainment means, wherein the lever and the ejection lever are coupled together by the entrainment means such that actuation of the operating handle up to an intermediate position rotates the lever, whilst the ejection lever remains unmoved, and actuation of the operating handle beyond the intermediate position rotates the lever and the ejection lever wherein the entrainment means comprises an elongated hole in which the journal is guided.

14. The locking device as claimed in claim 4, further comprising an entrainment means, wherein the lever and the ejection lever are coupled together by the entrainment means such that actuation of the operating handle up to an intermediate position rotates the lever, whilst the ejection lever remains unmoved, and actuation of the operating handle beyond the intermediate position rotates the lever and the ejection lever.

15. The locking device as claimed in claim 1, wherein the locking device is fastened on the vehicle structure and the counter element is fastened on the backrest.

16. The locking device as claimed in claim 1, wherein the locking device is fastened on the backrest and the counter element is fastened on the vehicle structure.

17. A locking device, for locking a backrest of a vehicle seat to a vehicle structure, the locking device comprising:
- a rotary latch lock for locking a counter element, the rotary latch lock comprising a rotary latch lock housing and at least a pawl for locking the counter element, the pawl being located in an interior space of the rotary latch lock housing; and
- an ejection lever pivotably mounted to the rotary latch lock housing, wherein the ejection lever is located at a position outside of the interior space of the rotary latch lock housing, the ejection lever comprising a counter element contacting surface, the counter element contacting surface contacting the counter element when the rotary latch lock is in an unlocked state such the ejection lever displaces the counter element relative to the rotary latch lock housing when an operating handle is actuated.

18. A locking device as claimed in claim 17, wherein the rotary latch lock housing comprises an outer rotary latch lock housing surface, the ejection lever being located adjacent to the outer rotary latch lock housing surface.

19. A locking device, for locking a backrest of a vehicle seat to a vehicle structure, the locking device comprising:
- a rotary latch lock for locking a counter element, the rotary latch lock comprising a rotary latch lock housing and at least a pawl located in an interior space of the rotary latch lock housing for locking the counter element;
- an ejection lever pivotably mounted to the rotary latch lock housing, the ejection lever comprising a counter element contacting surface;
- a rotary latch lock actuation lever connected to the ejection lever, the rotary latch lock actuation lever and the ejection lever being actuated when an operating handle is actuated such that the rotary latch lock actuation lever unlocks the pawl to provide an unlocked state of the rotary latch lock and the counter element contacting surface contacts the counter element to move the counter element relative to the rotary latch lock housing.

20. A locking device as claimed in claim 17, wherein the rotary latch lock housing comprises an outer rotary latch lock housing surface, at least a portion of the ejection lever being located adjacent to one area of the outer rotary latch lock housing surface, at least a portion of the rotary latch lock actuation lever being located adjacent to another area of the outer rotary latch lock housing surface, wherein the ejection lever and the rotary latch lock actuation lever are located outside of the interior space of the rotary latch lock housing.

* * * * *